United States Patent
Van Hoof et al.

(10) Patent No.: US 9,357,613 B2
(45) Date of Patent: May 31, 2016

(54) DISPLAY AND LIGHTING ARRANGEMENT FOR A FITTING ROOM

(75) Inventors: Willem Piet Van Hoof, Horst (NL); Erik Paul Paul Boonekamp, Utrecht (NL); Elena Tiziana Ferrari, Nuenen (NL); George Frederic Yianni, Eindhoven (NL)

(73) Assignee: KONINKLIJKE PHILIPS N.V., Eindhoven (NL)

( * ) Notice: Subject to any disclaimer, the term of this patent is extended or adjusted under 35 U.S.C. 154(b) by 507 days.

(21) Appl. No.: 13/704,721

(22) PCT Filed: May 23, 2011

(86) PCT No.: PCT/IB2011/052231
§ 371 (c)(1),
(2), (4) Date: Dec. 17, 2012

(87) PCT Pub. No.: WO2011/158143
PCT Pub. Date: Dec. 22, 2011

(65) Prior Publication Data
US 2013/0088154 A1 Apr. 11, 2013

(30) Foreign Application Priority Data
Jun. 17, 2010 (EP) .................................. 10166298

(51) Int. Cl.
H05B 37/02 (2006.01)

(52) U.S. Cl.
CPC ............ *H05B 37/02* (2013.01); *H05B 37/0227* (2013.01)

(58) Field of Classification Search
CPC ............................. H05B 37/02; H05B 37/0227
See application file for complete search history.

(56) References Cited

U.S. PATENT DOCUMENTS

| | | | |
|---|---|---|---|
| 6,799,865 B2 | 10/2004 | Ellens et al. | |
| 7,042,486 B2 * | 5/2006 | Manico et al. | 348/61 |
| 7,564,368 B2 * | 7/2009 | Segall | 340/815.4 |
| 7,572,028 B2 | 8/2009 | Mueller et al. | |
| 7,697,053 B2 * | 4/2010 | Kurtz et al. | 348/333.01 |
| 8,288,964 B2 * | 10/2012 | Hente et al. | 315/309 |
| 8,339,274 B2 * | 12/2012 | Van De Sluis et al. | 340/686.1 |
| 8,831,299 B2 * | 9/2014 | Kurtz et al. | 382/128 |
| 2009/0309513 A1 | 12/2009 | Bergman et al. | |

(Continued)

FOREIGN PATENT DOCUMENTS

| | | |
|---|---|---|
| FR | 2928809 A1 | 9/2009 |
| JP | 2005302500 A | 10/2005 |

(Continued)

*Primary Examiner* — Jung Kim
(74) *Attorney, Agent, or Firm* — Meenakshy Chakravorty

(57) ABSTRACT

The invention provides a display and lighting arrangement (100) comprising a display unit (110), a sensor system (120), a control unit (130) and a lighting system (140), wherein the sensor system (120) is configured to sense a person (1) in a predetermined area (2) and to generate a corresponding sensor system signal. The lighting system (140) comprises a first light source (141) configured to provide front face light (41) to the person (1) and a second light source (142) configured to provide top light (42) to the person (1) in the predetermined area (2). The control unit (130) is configured to derive a person feature from the sensor system signal and to control, based on the person feature, the light (41) of the first light source (141) and the light (42) of the second light source (142). The display unit (110) is configured to display an image (5) of the person (1) located in the predetermined area (2) to the person (1) in the predetermined area (2).

18 Claims, 1 Drawing Sheet

(56) References Cited

U.S. PATENT DOCUMENTS

2010/0001654 A1 1/2010 Chen et al.
2011/0283577 A1* 11/2011 Cornelissen et al. ........... 40/582

FOREIGN PATENT DOCUMENTS

| | | |
|---|---|---|
| JP | 200817146 A | 1/2008 |
| JP | 2008123859 A | 5/2008 |
| JP | 201055801 A | 3/2010 |
| JP | 2010123534 A | 6/2010 |
| WO | 2004049767 A1 | 6/2004 |
| WO | 2009004539 A1 | 1/2009 |
| WO | 2009090600 A1 | 7/2009 |
| WO | 2009109890 A1 | 9/2009 |
| WO | 2009138915 A1 | 11/2009 |

\* cited by examiner

DISPLAY AND LIGHTING ARRANGEMENT FOR A FITTING ROOM

FIELD OF THE INVENTION

The invention relates to a display and lighting arrangement as well as to a space comprising such a display and lighting arrangement. The invention also relates to a method of controlling light provided to a posing person.

BACKGROUND OF THE INVENTION

Adaptation of lighting to create specific effects is known in the art. U.S. Pat. No. 757,028, for instance, describes methods and apparatus for generating and modulating white light illumination conditions. Examples of applications in which such methods and apparatus may be implemented include retail environments (e.g., food, clothing, jewelry, paint, furniture, fabrics, etc.) or service environments (e.g., cosmetics, hair and beauty salons and spas, photography, etc.) where visible aspects of the products/services being offered are significant in attracting sales of the products/services. Other applications include theatre and cinema, medical and dental implementations, as well as vehicle-based (automotive) implementations. In another example, a personal grooming apparatus includes one or more light sources disposed in proximity to a mirror and configured to generate variable-color light, including essentially white light, whose color temperature may be controlled by a user.

US2010001654 describes an illumination system comprising an illumination assembly, a human body's signal detecting unit, a processing unit and an illumination direction adjustment unit. The illumination assembly projects an illumination light beam along an illumination direction; the human body's signal detecting unit detects at least one human body's signal released from at least one user to accordingly generate an intensity signal; the processing unit receives the intensity signal and transmits an illumination direction adjustment signal according to the intensity signal; and the illumination direction adjustment unit receives the illumination direction adjustment signal to automatically adjust the illumination direction.

WO2009090600 describes the automatic creation of an atmosphere, such as a lighting atmosphere combined with music, which is suited to social setting and mood in an environment such as a room. An embodiment of the invention provides a system for automatically creating an atmosphere suited to social setting and mood in an environment, comprising—a sound receiving unit being adapted for receiving sound from the environment and generating an audio signal representing the received sound,—an audio signal processing unit being adapted for receiving and analyzing the audio signal for social setting and mood in the environment, and—an atmosphere creation unit being adapted for automatically generating control signals for an atmosphere creation system for creating an atmosphere based on the result of the analysis of the audio signal. This system may allow a comfortable and automatic creation of an atmosphere suited to social setting and mood in an environment, for example a room.

SUMMARY OF THE INVENTION

A disadvantage of prior art systems may be that those systems cannot adapt lighting in an easy and intuitive way to specific uses, such as those in a fitting room, a grooming room, or in hospitality areas when persons are watching themselves in a mirror.

Fitting rooms are where shoppers make the buying decision, and lighting will influence the way the shopper perceives him/herself in the mirror and therefore is expected to be a major influence in making a positive buying decision. Research indicates that shoppers are more likely to lose interest in the clothing in the fitting room if the lighting is unflattering. Lighting that makes shoppers look their best will positively influence their buying decision. Herein, it is proposed to provide "flattering" lighting for instance a shopper by actively tuning the lighting so as to be the most flattering (for the shopper).

There is much information available about making items, or people, look more attractive by means of lighting. Studio photographers use a wide array of lighting equipment to make a model look as attractive as possible. However, in a studio environment, the photographer can fine tune the lighting to the location and the stature and looks of the model. In a fitting room or other similar areas this is not possible. This means that when creating a static flattering lighting setting, this setting might only be flattering to people of a certain stature, skin tone, and/or hair color.

Herein, a solution to this problem may be provided by automatically tuning the lighting to the needs of the shopper in the fitting room (or in other spaces).

Hence, it is an aspect of the invention to provide an alternative display and lighting arrangement, as well as a lighting arrangement for such a display and lighting arrangement, which preferably further at least partly obviate one or more of the above-described drawbacks. It is also an aspect of the invention to provide an alternative method of controlling light provided to a posing person.

In a first aspect, the invention provides a display and lighting arrangement comprising a display unit, a sensor system, a control unit and a lighting system, wherein (a) the sensor system is configured to sense a person in a predetermined area and to generate a corresponding sensor system signal, (b) the lighting system comprises (one or more of) (1) a first light source configured to provide front face light to the person and (2) a second light source configured to provide top light to the person in the predetermined area, (c) the control unit is configured to derive a person feature from the sensor system signal and to control, based on the person feature, light of (one or more of) the first light source and the second light source, and (d) the display unit is configured to display an image of the person located in the predetermined area to the person in the predetermined area.

Herein, the display and lighting arrangement is amongst others defined as if a person were present in the predetermined area (see also below). As will be clear to the person skilled in the art, the person is not part of the display and lighting arrangement or of the lighting arrangement, but is only described in the arrangements, etc., for a better understanding.

The display and lighting arrangement may provide an easy and intuitive way of adapting the lighting of the light sources so as to be "flattering" to the person watching his/her image. For instance, warm light may be used when a white/light skin is perceived by the sensor system, and cool light might be used when a dark/black skin is perceived by the sensor system. However, lighting may also be adapted if wrinkles (shadows in the face) may be perceived.

The term display and lighting arrangement relates to a combination of devices, and especially relates to the dedicated arrangement thereof. The devices may communicate in wired and/or wireless mode. The display and lighting arrangement at least comprises a display unit, a sensor system, a control unit and a lighting system.

As mentioned above, the display unit is configured to display an image of the person located in the predetermined area to the person in the predetermined area. In other words, the person whose image is produced may observe his/her own image. It is not necessarily excluded that another person might perceive the image. For instance, the display and lighting arrangement might be integrated with a security system. However, in a specific embodiment, the display and lighting arrangement is a stand-alone system, without transfer of the image to a device or system other than the arrangement to which it belongs. The phrase "display an image of the person located in the predetermined area to the person" and phrases similar to this thus indicate that the person of whom an image is displayed is also able to see that image.

The term "person" especially relates to a single person (human), but may in a specific embodiment also relate to a plurality of persons (humans). The term person may relate to an adult or a child, and may relate to male or female persons. The term image may also relate to a plurality of (consecutive) images. Hence, in a specific embodiment, the term image may also relate to a video (a plurality of video images taken over a period of time).

It may be desirable to instantaneously view one's image, but under certain circumstances it may also be desirable to have a delay. Hence, in an embodiment, the display unit is configured to display the image of the person with a predetermined or user-defined delay. Hence, in an embodiment, the delay is tunable by a user (especially by the person). Such a delay may for instance be used when one desires to see one's back. Note that this embodiment only applies to display units based on a display device (and not a mirror; see below).

In an embodiment, the display unit comprises a mirror (to provide a mirror image of the person in the predetermined area), more especially, in an embodiment the display unit is a mirror. An advantage of using a mirror is that the display and lighting arrangement, or at least the display unit, may be relatively simple and cheap. Further, it is not necessary (but not excluded) to use a camera to capture an image or images of the person. A disadvantage may be that images of the person may not (temporarily) be stored and hence delay of the display of the image is impossible. Thus, the phrase "the display unit is arranged to display an image of the person located in the predetermined area to the person in the predetermined area" may refer to a mirror showing a mirror image of the person in front of the mirror. The term "displaying", when used in an embodiment, may thus refer to mirroring.

In yet another embodiment, the display unit comprises a display device (i.e. an electronic display device), such as a LCD or plasma screen. In such embodiments, the display and lighting arrangement also comprises a camera to capture one or more images of the person. This camera may be part of the general display and lighting arrangement and/or may be comprised in the display unit. Hence, in a specific embodiment, the display unit comprises a camera to take an image of the person and a display to display the image of the person. In the former embodiment, the camera may be part of the sensor system, and may thus also be used to generate a sensor system signal. In the latter embodiment, the camera may solely be used to take an image and display the image.

The term sensor system herein relates to a system that comprises at least one sensor. However, the sensor may comprise a plurality of sensors of different types. For instance, the sensor system may comprise a camera configured to sense the person. Such a camera may provide information on a plurality of features of the person. The term "camera" may, in an embodiment, also relate to a plurality of cameras.

The sensor system is configured to sense a person in a predetermined area and to generate a corresponding sensor system signal. The phrase "sensing a person" and similar phrases may refer to sensing a specific feature of a person, such as skin tone, stature, weight, which may for instance be performed with a dedicated sensor. Additionally or alternatively, the phrase "sensing a person" and similar phrases may also refer to producing an image of the person, and deriving a person feature from that image.

Information ("person feature") that may be derived (especially by the control unit) from cameras may for instance be skin tone, the presence of wrinkles, skin irregularities, hair color, complexion, the color of garment, but also a person's mood ((un)happy, in a hurry/relaxed etc.) which may be derived from the expression of the face, stature, age, gender, etc. The term "person feature" thus relates to a feature of that person. In a specific embodiment, the person feature may also relate to a plurality of features. The term "skin tone" may amongst others (also) refer to skin reflectiveness, skin undertone, skin complexion, glossiness of the skin, etc.

The term "person feature" may also relate to a plurality of person features.

In a specific embodiment, the sensor system may comprise a second camera configured to sense the person from another position than the first camera (if present). Such a camera may for instance be configured to take one or more images of the back or side of a person. In an embodiment where no first camera is present, for instance when a mirror is applied, the "second" camera may also be configured to sense the person from another position than the display unit does.

The sensor system may alternatively or additionally comprise a skin tone sensor (configured to sense a person's skin tone).

The sensor system may alternatively or additionally also include one or more sensors to determine a person's weight (weight sensor), stature (stature sensor).

The sensor system may also comprise an RFID sensor, which may be configured to detect an RFID chip of a garment present in the area, especially a garment worn by the person. In a specific embodiment, the term "person feature" may thus also relate to a garment (article of clothing or clothing item) worn by the person.

The control unit is configured to derive a person feature from the sensor system signal and to control, based on the person feature, the light of the first light source and(or) the light of the second light source. The control unit may comprise one central control unit but may also include satellite control units. For instance, the display unit, if display camera-based, may comprise a separate control unit to control the camera and the display, which separate control unit is configured to provide a very good image on the display.

Optionally, such a satellite control unit may be configured to derive a person feature from the sensor, and send this information with the sensor signal to the central control unit.

Herein, the term control unit at least refers to a unit that controls the light sources (see below) and optionally other devices (see also below), as a function of one or more features of the person (see also below).

The control unit is configured to derive a person feature (optionally including a plurality of person features) from the sensor signal. Examples of person features are among others indicated hereinabove.

Especially, the control unit is configured to control the light of the first light source, and the light of the second light source, (and optionally other devices), as a function of one or more person features selected from the group consisting of skin tone, skin irregularities, hair color, color of a clothing item, face expression, movement of the person within the predetermined area, position of the person within the predetermined area, stature, age, gender of the person.

Especially, the control unit may be configured to control one or more features selected from the group consisting of light intensity, color temperature, color, saturation, hue, beam direction, and beam angle of one or more of the first light source and the second light source and optionally a further light source (see also below). Further, the control unit may be arranged to control one or more of those features of the light sources in relation to each other. As mentioned above, the control unit may also control other devices (see also below).

The control unit may control the light source(s), and optional other devices, in a wireless or wired mode. Further, the control unit may include a storage device, configured to store one or more images. For instance, storage of the one or more images may be used to display the image(s) with a delay. Optionally, the control unit may also comprise a communication device to transfer an image to an item external to the display and lighting arrangement. For instance, the control unit may comprise a USB port or other ports. The control unit may comprise a Bluetooth communication device or other communication device for exchanging data over a distance (for instance using short length radio waves). The control unit may for instance comprise one or more user input devices to manually control for instance one or more light sources, the image display delay (if applicable), and other devices (if present; see also below).

The control unit may also be configured to control an audio device, in particular on the basis of the person feature. Further, the control unit may be configured to control the light source(s) and optional other devices, not only based on the person feature, but also on one or more other parameters, such as time of the day, day, week, month, year, season, sound, temperature, humidity, air pressure, etc.

The lighting system comprises at least one light source. Preferably, the term "lighting system" herein refers to a system comprising a plurality of light sources, which may be independent of each other, but of which at least two types are controlled by the control unit. Herein, the lighting system preferably comprises at least two types of different light sources, but may optionally also comprise other types of light sources. The lighting system at least comprises a first light ("front light") source configured to provide front face light to the person and(/or) a second light source ("down light") configured to provide top light to the person in the predetermined area. Especially the front face lighting may be generated from the same direction as the direction from which the person receives the image. The top light source, or second light source, will in general be arranged at a height of at least about 2.5 m. In this way, light may be provided over the person.

As regards those two types of light used, the top light may provide general lighting and/or sphere lighting, whereas the front light may be used to (especially) illuminate the garment(s) worn by the person. Especially, the display unit may further comprise the first light source. Down lighting, from the second light source, may help adding depth to the image of the person displayed on the mirror or display. The first light source may for instance fill in the dark shadows created by the down light and optional spotlight (see below). Especially, the front light may be diffuse front light. Front lighting may (thus) decrease the visibility of wrinkles and other "imperfections". Hence, the down light may be configured for creating general lighting and the front light may be configured to fill in the dark areas. In a specific embodiment, the lighting system may comprise one single unit with a plurality of light sources. Preferably, such a single unit comprises one or more light sources that qualify as first light sources and one or more light sources that qualify as second light sources.

Optionally, the display unit comprises a light source that qualifies as first light source, and the display and lighting arrangement also comprises one or more further light sources that qualify as first light source. Hence, in an embodiment the term "first light source" may also relate to a plurality of first light sources. Alternatively or additionally, in another embodiment the term "second light source" may also relate to a plurality of second light sources.

For each of the first and the second light source it holds that one or more features selected from the group consisting of light intensity, color temperature, color, saturation, hue, beam direction, and beam angle may be variable. Preferably, of at least one of the light sources at least one or more of the color temperature, color, saturation, and hue is variable. Further, preferably for both the first and the second light source it holds that the intensity is variable. Herein, the term "variable intensity" and similar terms refer to the variability of the intensity of the light between "on" and "off" (thus including at least one setting with a light intensity between on and off).

Hence, in a specific embodiment, the control unit is configured to control one or more features selected from the group consisting of light intensity, color temperature, color, saturation, hue, beam direction, and beam angle of one or more of the first light source and the second light source, based on the person feature, especially as a function of one or more person features selected from the group consisting of skin tone, presence of wrinkles, skin irregularities, hair color, color of a clothing item, face expression, movement of the person within the predetermined area, position of the person within the predetermined area, stature, age, gender of the person.

In embodiments where the first light source comprises a plurality of first light sources, one or more of those features may be controlled for each individual light source within the plurality of first light sources. However, the features may also be controlled for one or more subsets of light sources within the plurality of first light sources. Likewise, in embodiments wherein the second light source comprises a plurality of second light sources, one or more of those features may be controlled for each individual light source within the plurality of second light sources. However, the features may also be controlled for one or more subsets of light sources within the plurality of second light sources. In a specific embodiment, the display and lighting arrangement, or especially the lighting system, may further comprise a third light source with an adjustable beam of light. Herein, adjustability may refer to one or more of beam angle and beam direction, especially to at least the beam direction. In such (an) embodiment(s), the control unit is further configured to control the light of the third light source based on the person feature. Such a third light source may for instance be a spot light. Such a third light source may be used to increase brightness and/or to make for instance hair look healthier. Further, such a third light source may be used to create contrast and/or to create a sparkling effect (especially by using for instance halogen lamps).

The "predetermined area" may for instance be the area of a floor of a fitting room or grooming room, etc., or part thereof. The term predetermined area refers to that area where a person may assume various postures, and which area allows displaying the image thereof to the person located in the predetermined area. The term "predetermined area" not necessarily refers to a horizontal floor area, but may also relate to virtual areas above a floor, at any angle with respect to the earth's surface. Referring to a mirror as display unit, the predetermined area may be the area substantially in front of the mirror.

In a further aspect, the invention provides a space comprising a display and lighting arrangement as described herein. For instance, the invention may be applied in a fitting room. However, (parts of) the display and lighting arrangement could also be used in home applications (bathroom or dressing mirror), hospitality (bathroom, powder and dressing rooms) and retail (hairdresser and cosmetic shops). Other applications may for instance be in (hotel) lobbies, etc.

Hence, in a specific embodiment, the space is a fitting room comprising the display and lighting arrangement as defined herein. In yet another embodiment, the space is a hospitality area comprising a display and lighting arrangement as defined herein.

In a specific embodiment, the space may further comprise an object having a variable color, wherein the object having a variable color is arranged, relative to the display unit, downstream of the predetermined area, and wherein the control unit is further configured to control the color of the object having a variable color, based on the person feature. In an embodiment, an optional further device comprises such an object having a variable color, such as a wall of variable color. For instance, a wall, or part of a wall, arranged opposite the mirror or display of the display unit may comprise such an object. For instance, the color of clothing can be emphasized by blending colored light into the front lighting and/or by tuning the color of the (back) wall to a complementary color to the clothing. The object may for instance be a kind of back-lighting unit providing (diffuse) (colored) "back lighting". An example of a flat lighting device is for instance described in U.S. Pat. No. 6,799,865.

In a specific embodiment, the display and lighting arrangement may consist of a set of sensors (sensor unit), a computing unit (control unit), a display unit, especially a mirror, and lighting equipment (lighting system). The sensors take measurements of the person in the fitting room, like skin tone, hair color, color of the clothing, and contrast (wrinkles). This information is then used to calculate the most flattering light for the shopper (the posing person). For instance, by constantly measuring and fine tuning the lighting, an ideal setting is created that shows both the shopper and the clothing he/she is wearing in the best possible way. The proposed lighting system may consist of at least one diffuse tunable front lighting (cool white, warm white, red, green, amber and blue LEDs), at least one, but preferably at least two directable and dimmable spotlights, a wide-angle dimmable-down lighter and a color tunable back wall.

The lighting arrangement per se is also part of the invention. Such a lighting arrangement may be installed in a space comprising a display unit, such as a mirror. Hence, in a further aspect, the invention provides a lighting arrangement, for instance for use in a display and lighting arrangement as defined herein, wherein the lighting arrangement comprises, a sensor system, a control unit and a lighting system, wherein (a) the sensor system is configured to sense a person in a predetermined area and to generate a corresponding sensor system signal, (b) the lighting system comprises a first light source and (/or) a second light source, and (c) the control unit is configured to derive a person feature from the sensor system signal and to control, based on the person feature, the light of the first light source and of the second light source.

Yet, in a further aspect, the invention also provides a method of controlling light provided to a posing person comprising (a) sensing the person in the predetermined area and generating a corresponding sensor system signal, (b) deriving a person feature from the sensor system signal, (c) controlling, based on the person feature, light of a first light source, configured to provide front face light to the person in the predetermined area, and(/or) of a second light source, configured to provide top light to the person in the predetermined area, and (d) displaying an image of the person located in a predetermined area to the person in the predetermined area. Such a method may especially be applied with the display and lighting arrangement of the invention. Hence, the invention also provides such a method, wherein the display and lighting system according as defined herein is applied. The term "posing" person refers to a person who desires to see him/herself displayed by the display unit, such as in a mirror or on a display.

The term "substantially" herein, such as in "substantially all emission" or in "substantially consists", will be understood by the person skilled in the art. The term "substantially" may also include embodiments with "entirely", "completely", "all", etc. Hence, in embodiments the adjective substantially may also be removed. Where applicable, the term "substantially" may also relate to 90% or higher, such as 95% or higher, especially 99% or higher, even more especially 99.5% or higher, including 100%. The term "comprise" includes also embodiments where the term "comprises" means "consists of".

Furthermore, the terms first, second, third and the like in the description and in the claims, are used for distinguishing between similar elements and not necessarily for describing a sequential or chronological order. It is to be understood that the terms so used are interchangeable under appropriate circumstances and that the embodiments of the invention described herein are capable of operation in sequences other than those described or illustrated herein.

The devices referred to herein are amongst others described during operation. As will be clear to the person skilled in the art, the invention is not limited to methods of operation or devices in operation.

It should be noted that the above-mentioned embodiments illustrate rather than limit the invention, and that those skilled in the art will be able to design many alternative embodiments without departing from the scope of the appended claims. In the claims, any reference signs placed between parentheses shall not be construed as limiting the claim. Use of the verb "to comprise" and its conjugations does not exclude the presence of elements or steps other than those stated in a claim. The article "a" or "an" preceding an element does not exclude the presence of a plurality of such elements. The invention may be implemented by means of hardware comprising several distinct elements, and by means of a suitably programmed computer. In the device claim enumerating several means, several of these means may be embodied by one and the same item of hardware. The mere fact that certain measures are recited in mutually different dependent claims does not indicate that a combination of these measures cannot be used to advantage.

The terms "upstream" and "downstream" relate to an arrangement of items or features relative to the propagation of light from a light generating means (here particularly the first light source), wherein relative to a first position within a beam of light from the light generating means, a second position in the beam of light closer to the light generating means is "upstream", and a third position within the beam of light further away from the light generating means is "downstream".

BRIEF DESCRIPTION OF THE DRAWINGS

Embodiments of the invention will now be described, by way of example only, with reference to the accompanying schematic drawings in which corresponding reference symbols indicate corresponding parts, and in which.

DESCRIPTION OF PREFERRED EMBODIMENTS

Figure 1:
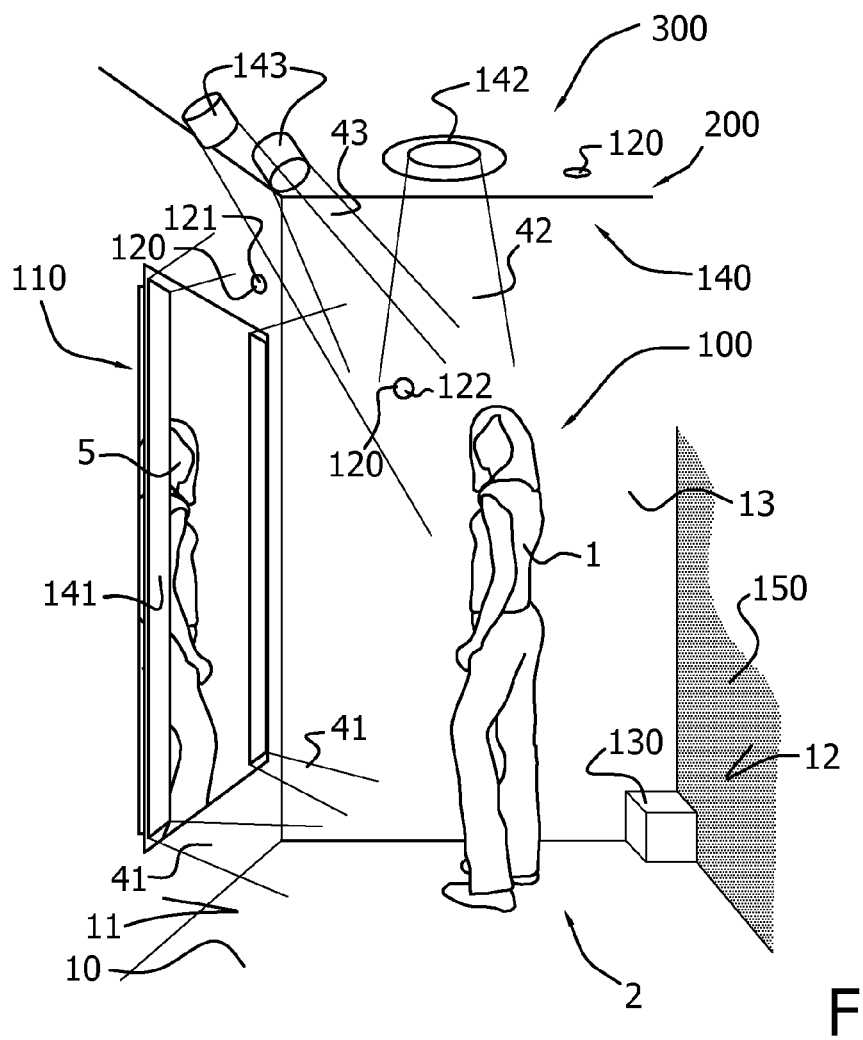
FIG. 1 schematically depicts an embodiment of the display and lighting arrangement and variations on this embodiment.

FIG. 1 schematically depicts a display and lighting arrangement 100, which comprises a display unit 110, a sensor system 120, a control unit 130 and a lighting system 140.

The sensor system 120 is configured to sense a person 1 in a predetermined area 2 and to generate a corresponding sensor system signal. Here, the predetermined area 2 or even the entire floor 10 may be part of the fitting room, which is here schematically depicted. The space comprising the display and lighting arrangement 100 is indicated with reference 300.

Figure 2:
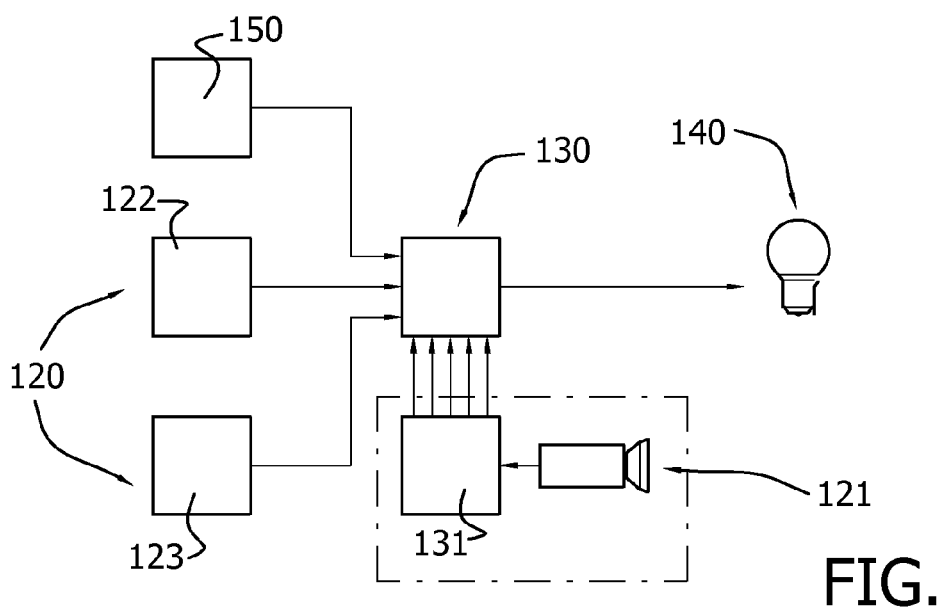
FIG. 2 schematically depicts how the display and lighting arrangement may be configured and function as desired.

The lighting system 140 comprises a first light source 141 configured to provide front face light 41 to the person 1 in the predetermined area 2 and a second light source 142 configured to provide top light 42 to the person 1 in the predetermined area 2. The first light source 141 may for instance be arranged on a wall 11, but may for instance also be integrated in a display unit (see below). In FIG. 2, the first light source 141 is integrated in the display unit.

The control unit 130 is configured to derive a person feature from the sensor system signal and is configured to control, based on the person feature, the light 41 of the first light source 141 and the light 42 of the second light source 142. Further, the display unit 110 is configured to display an image 5 of the person 1 located in the predetermined area 2 to the person 1 in the predetermined area 2; as can be seen in the Figure, the person 1 is able to see his/her own image 5 displayed by the display unit 110. The display unit 110 may for instance be a mirror or may for instance comprise a display device. In the latter case, the display and lighting arrangement 100 will further comprise a camera to generate the image 5 of the person 1. The posing person 1 in the predetermined area 2 is thus able to see his own image 5.

FIG. 1 thus schematically also depicts an embodiment of the lighting arrangement, indicated with reference 200, for use in the display and lighting arrangement 100. The lighting arrangement 200 comprises sensor system 120, control unit 130 and lighting system 140, wherein (a) the sensor system 120 is configured to sense person 1 in predetermined area 2 and to generate a corresponding sensor system signal, (b) the lighting system 140 in this schematically depicted embodiment comprises first light source 141 and second light source 142, and (c) control unit 130 is configured to derive a person feature from the sensor system signal and to control, based on the person feature, the light 41 of first light source 141 and of second light source 142 (and optional other devices).

By way of example, the sensor system 120 here comprises a camera 121 and a skin sensor 122. Thus, by way of example, the sensor system 120 comprises a plurality of sensors. The camera 121 may be used to generate image 5 in the case of the display unit 110 comprising a display device, but may additionally or alternatively also be used to create the sensor signal from which a person feature may be derived.

Further, by way of example, the display and lighting arrangement 100 (and thus also lighting arrangement 200) further comprises a third light source 143, preferably emitting an adjustable beam of light 43. For instance, beam angle and/or beam direction may be adjustable. Then, the control unit 130 is preferably further configured to control the light 43 of the third light source 143, based on the person feature.

A further camera (not depicted), such as a second camera to produce an image of a side or the back of the person 1 may be arranged at a back wall 12 or a side wall 13. Also a plurality of second cameras may be applied.

The display and lighting arrangement 100 (and also the lighting arrangement 200) may further comprise an object 150 having a variable color. Here, space 300 comprises such an object 150. By way of example, the back wall 12 is such an object 150. The object 150 may have a variable color. Here, the object 150 is arranged, relative to the display unit 110, downstream of the predetermined area 2. Especially, the control unit 130 is further configured to control the color of the variable-color object 150, based on the person feature.

FIG. 2 schematically depicts how the display and lighting arrangement may function and communicate. The control unit 130 receives information from the sensor(s) of the sensor unit 120, here by way of example skin tone sensor 122 and RFID sensor 123. Further, optional camera 121 may be used to create an image from which a person feature may be derived. Optionally, the camera signal is processed by a satellite controller 131. From the sensor signals, the control unit 130 derives one or more person features and controls the light of the lighting unit 140. Optionally, the display and lighting arrangement 100 may further comprise a memory 150, which may be used to store one or more images, but which additionally and/or alternatively may also be used to (temporarily) store user preference data. For instance, the RFID sensor 123 may derive a client code from a client card and check client preferences in a library and/or derive the client preferences from the RFID chip of the client card.

Hence, the display and lighting arrangement may use a range of methods of tuning the lighting. The different methods can be used as standalone solutions or in combination:

Skin tone: The color spectrum of the illuminating light can have a large effect on a person's perception of himself or herself. Which spectrum should be used to create the most positive reaction in a fitting room is strongly linked to the skin tone of the user. By measuring the skin color and adjusting the lighting, the rendering of the skin color can be tuned to look a bit darker than in daylight. The same may hold for e.g. jeans. By adding more blue to the lighting, the blueness of the jeans will be more accentuated. A sensor built into a mirror can measure the skin color. This input is then used to tune the front lighting by adding e.g. a bit redder light and yellow light to make Caucasian skin appear more tanned.

Reflection: In studio photography spotlights are often used to add highlights to a model's appearance. However, a glossy skin will not look very attractive when brightly lit by a spotlight. It is therefore suggested to measure the glossiness of the skin and tune the brightness of the spotlights to an ideal intensity.

Stature: In order to properly light a subject, the direction of the spotlights is very important. A camera should therefore measure the stature and location of the shopper in the fitting room. By using directable spotlights, the light can be tuned to the person in the fitting room.

Back wall: To make the clothing look as attractive as possible, it is important that the clothing stands out from the background. By tuning the color of the background so as to be complementary to the color of the clothing, the clothing will really stand out from the background.

Irregularities: Irregularities in the skin, like wrinkles or cellulite, can be greatly overemphasized by down light. The proposed solution produces an image of the skin, measures the contrast in the skin (difference between the shadows cast by imperfections like wrinkles) and tunes the combination of front and down lighting to an ideal level for the shopper.

The system may need to gather data on the user of the fitting room in order to determine the most suitable scene. This can be achieved by means of one or more of the following:

1. A scene setting system using various sensor inputs to determine the lighting configuration that is most flattering to the user of the fitting room.
2. A controllable lighting system which creates the scene generated by the scene setting system.
3. User preference data stored on for example a scanned loyalty card.
4. Measurements from a dedicated skin tone sensor in the changing room.
5. Information about the clothing being tried on, looked up from reading RFID tags on the clothing.
6. Information from a computer vision system regarding e.g. stature, hair/skin color, clothing etc.

The system could be realized in multiple ways, depending on the extent of the functionality.

For a fully functional system, a computer vision system will need to be employed. A camera connected to computer vision software can monitor the fitting room. As the fitting room is a fixed and controlled environment, different from the standard, not further specified, field of representing users, this information can be used to easily estimate stature and position of the user (this task is commonly called feature extraction or edge detection). The system can further analyze the image in a process called color segmentation to identify the skin tone of a user, hair color and the primary colors present in the clothing.

According to a simpler system, the user could place his skin in contact with a sensor for scanning the skin pigmentation. Such devices are commonly used in the cosmetics industry for determining skin tone, and they operate by examining the spectrum of light reflected from the skin.

Such systems could be coupled to a system which scans RFID tags on clothing in order to look up their colors either from information stored in the tag or a central database.

The invention claimed is:

1. A display and lighting arrangement comprising a display unit, a sensor system, a control unit and a lighting system, wherein:
   the sensor system is configured to sense a person in a predetermined area and to generate a corresponding sensor system signal;
   the lighting system comprises a first light source configured to provide front face light to the person and a second light source configured to provide top light to the person in the predetermined area;
   the control unit is configured to derive at least one person feature from the sensor system signal and to control, based on the person feature, the light of the first light source and the light of the second light source, wherein the person feature includes a skin tone of the person and wherein the control unit is configured to control the lighting system based on the derived skin tone such that a proportion of at least one of red light or yellow light in at least one of said front face light or said top light is an increasing function of lightness of said derived skin tone; and
   the display unit is configured to display an image of the person located in the predetermined area to the person in the predetermined area.

2. The display and lighting arrangement according to claim 1, wherein the display unit is a mirror.

3. The display and lighting arrangement according to claim 1, wherein the display unit comprises a display device.

4. The display and lighting arrangement according to claim 3, wherein the sensor system comprises a camera configured to sense the person.

5. The display and lighting arrangement according to claim 3, wherein the display unit is configured to display the image of the person with a predetermined or user-defined delay.

6. The display and lighting arrangement according to claim 3, wherein the at least one person feature further includes at least one of the presence of wrinkles, skin irregularities, hair color, color of a clothing item, face expression, movement of the person within the predetermined area, position of the person within the predetermined area, stature, age, or gender of the person, and wherein the control unit is configured to control one or more further features comprising at least one of light intensity color, saturation, hue, beam direction, or beam angle of one or more of the first light source and the second light source.

7. The display and lighting arrangement according to claim 3, wherein the sensor system comprises a skin tone sensor.

8. The display and lighting arrangement according to claim 3, further comprising a third light source configured to provide an adjustable beam of light, and wherein the control unit is further configured to control the light of the third light source based on the person feature.

9. A space comprising a display and lighting arrangement, the display and lighting arrangement comprising a display unit, a sensor system, a control unit and a lighting system, wherein:
   the sensor system is configured to sense a person in a predetermined area and to generate a corresponding sensor system signal;
   the lighting system comprises a first light source configured to provide front face light to the person and a second light source configured to provide top light to the person in the predetermined area;
   the control unit is configured to derive at least one person feature from the sensor system signal and to control, based on the person feature, the light of the first light source and the light of the second light source, wherein the person feature includes a skin tone of the person and wherein the control unit is configured to control the lighting system based on the derived skin tone such that a proportion of at least one of red light or yellow light in at least one of said front face light or said top light is an increasing function of lightness of said derived skin tone; and
   the display unit is configured to display an image of the person located in the predetermined area to the person in the predetermined area.

10. The space according to claim 9, wherein the space is a fitting room comprising a display and lighting arrangement.

11. The space according to claim 9, wherein the space is a hospitality area comprising a display and lighting arrangement.

12. The space according to claim 9, further comprising an object having a variable color, wherein the object having a variable color is arranged, relative to the display unit, downstream of the predetermined area, and wherein the control unit is further configured to control the color of the object having a variable color, based on the person feature.

13. A lighting arrangement comprising a sensor system, a control unit and a lighting system, wherein:
the sensor system is configured to sense a person and to generate a corresponding sensor system signal;
the lighting system comprises a first light source and a second light source; and
the control unit is configured to derive a person feature from the sensor system signal and to control, based on the person feature, the light of the first light source and light of the second light source,
wherein the person feature includes a skin tone of the person and wherein the control unit is configured to control the lighting system based on the derived skin tone such that a proportion of at least one of red light or yellow light in at least one of the light of the first light source or the light of the second light source is an increasing function of lightness of said derived skin tone.

14. A method of controlling light provided to a posing person, comprising:
sensing the person in a predetermined area, sensing a radio-frequency identification (RFID) tag on an item of clothing, and generating a corresponding sensor system signal indicating at least one feature of the item of clothing based on the RFID tag;
deriving at least one person feature from the sensor system signal, wherein the person feature includes the at least one feature of the item of clothing;
controlling, based on the person feature, light of a first light source, configured to provide front face light to the person in the predetermined area, and of a second light source, configured to provide top light to the person in the predetermined area; and
displaying an image of the person located in a predetermined area to the person in the predetermined area.

15. The method according to claim 14, wherein a display and lighting arrangement are applied, wherein the display and lighting arrangement comprises a display unit, a sensor system, a control unit and a lighting system, wherein:
the sensor system is configured to perform said sensing of the RFID tag;
the lighting system comprises said first light source and said second light source;
the control unit is configured to perform said deriving and to perform said controlling; and
the display unit is configured to perform said displaying.

16. The lighting arrangement according to claim 13, wherein the control unit is further configured to control the light of the first light source, and the light of the second light source, as a function of at least one of (a) movement of the person within the predetermined area, (b) position of the person in the predetermined area, (c) the presence of wrinkles, (d) skin irregularities, (e) hair color, (f) color of a clothing item, (g) face expression, (h) stature, (i) age, (j) gender, (k) weight of the person, (l) garment worn by the person, or (m) the person's mood, and wherein the control unit is further configured to control at least one of light intensity, saturation, hue, beam direction, or beam angle of one or more of the first source and the second light source.

17. The method of claim 14, wherein the person feature includes a skin tone of the person and wherein the controlling comprises controlling at least one of the first light source or the second light source of the lighting system based on the derived skin tone such that a proportion of at least one of red light or yellow light in at least one of said front face light or said top light is an increasing function of lightness of said derived skin tone.

18. The display and lighting arrangement according to claim 1, wherein the sensor system is configured to sense a radio-frequency identification (RFID) tag on an item of clothing and wherein the at least one person feature further includes at least one feature of the item of clothing indicated by the RFID tag.

* * * * *